United States Patent [19]

Kage

[11] 4,105,979
[45] Aug. 8, 1978

[54] CLOCK REGENERATOR COMPRISING A FREQUENCY DIVIDER CONTROLLED BY AN UP-DOWN COUNTER

[75] Inventor: Kouzou Kage, Tokyo, Japan

[73] Assignee: Nippon Electric Co., Ltd., Tokyo, Japan

[21] Appl. No.: 792,952

[22] Filed: May 2, 1977

[30] Foreign Application Priority Data

May 10, 1976 [JP] Japan .................................. 51-53424

[51] Int. Cl.² ........................... H03K 5/01; H03K 3/64
[52] U.S. Cl. ....................................... 328/164; 328/63; 328/74; 328/134; 328/44
[58] Field of Search ...................... 328/63, 164, 74, 44, 328/133, 134

[56] References Cited

U.S. PATENT DOCUMENTS

| | | | |
|---|---|---|---|
| 3,671,875 | 6/1972 | Pento | 328/164 X |
| 3,781,696 | 12/1973 | Van Loon et al. | 328/164 |
| 3,952,254 | 4/1976 | Kurita et al. | 328/63 |

*Primary Examiner*—John S. Heyman
*Attorney, Agent, or Firm*—Sughrue, Rothwell, Mion, Zinn and Macpeak

[57] ABSTRACT

A clock regenerator for an input data signal varying between a high and a low level at one or more bit periods comprises a controllable frequency divider for frequency dividing a local signal of a high frequency at a frequency division ratio into a regenerated clock signal. When the regenerated clock signal has a leading and a lagging phase difference relative to the input data signal, a counter preset once in every regenerated clock period with a reference value for the frequency division ratio up-counts and down-counts, respectively, the reference value as a function of the amount of the phase difference to control the frequency division ratio.

5 Claims, 7 Drawing Figures

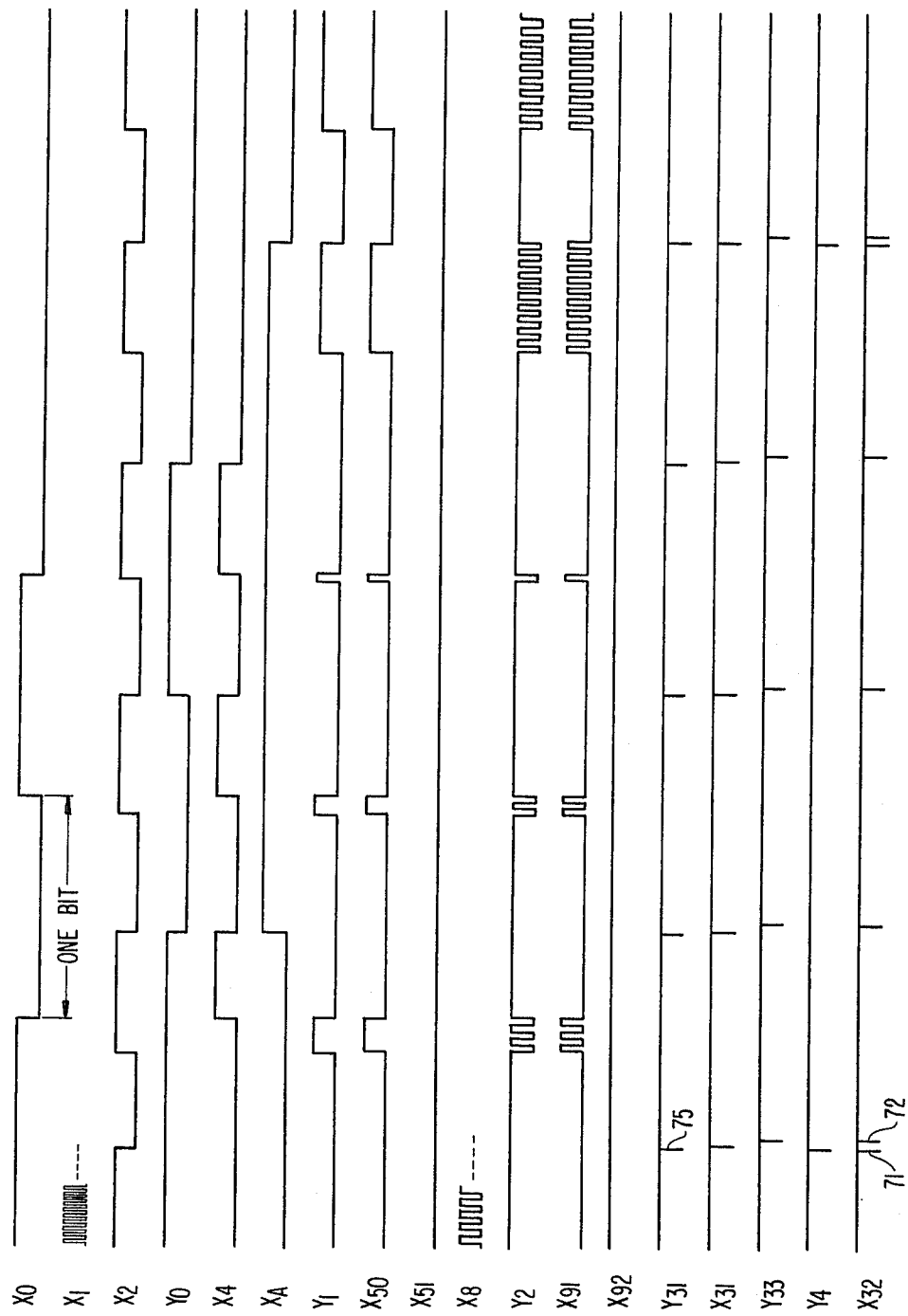

CLOCK REGENERATOR COMPRISING A FREQUENCY DIVIDER CONTROLLED BY AN UP-DOWN COUNTER

BACKGROUND OF THE INVENTION

This invention relates to a clock regenerator for regenerating a clock signal from a received data signal.

As will later be described in more detail with reference to a few figures of the accompanying drawing, a conventional clock regenerator for an input data signal comprises a controllable frequency divider for producing a regenerated clock signal in response to a local signal of a stable frequency. According as the regenerated clock signal leads or lags behind the input data signal, the frequency divider is controlled to divide the stable frequency at a smaller or a greater frequency division ratio than a normal one, respectively, to phase-synchronize the regenerated clock signal with the input data signal. When a difference between the smaller or greater frequency division ratio and the normal one is smaller, a longer time is necessary to achieve the phase synchronizm. When the difference is greater, a shorter time is sufficient. It is, however, inevitable in the latter event that jitter occurs in the phase of the regenerated clock signal and hardly disappears even when there is no jitter in the phase of the input data signal.

SUMMARY OF THE INVENTION

It is therefore an object of the present invention to provide a clock regenerator responsive to an input data signal for producing a regenerated clock signal, whereby it is possible to achieve correct phase synchronism between the input data signal and the regenerated clock signal within a short period of time and to maintain the correct phase synchronism.

It is another object of this invention to provide a clock regenerator of the type described, whereby it is possible to reduce phase jitter which might occur in the regenerated clock signal.

This invention is applicable to a clock regenerator responsive to an input data signal taking one of a first and a second state during at least one bit period for producing a regenerated clock signal of a regenerated clock period phase-synchronized with the bit period, which regenerator comprises a local oscillator for generating a local signal of a local signal frequency substantially equal to an integral multiple of the bit frequency of the input data signal, a controllable frequency divider for frequency dividing the local signal at a frequency division ratio into the regenerated clock signal, first means responsive to the input data and regenerated clock signals for producing an anti-coincidence signal, hereinafter referred to as an incoincidence signal, when a point of variation between the first and second states appears during one of the successive regenerated clock periods in the input data signal, second means responsive to the input data and regenerated clock signals for producing a phase difference signal representative of a phase difference between each of the successive bit periods and a corresponding one of the successive regenerated clock periods, and third means responsive to the incoincidence and phase difference signals for controlling the frequency division ratio. In accordance with this invention, the third means comprises pulse group means responsive to the phase difference signal for producing a group of at least one pulse of a number indicative of the phase difference and control means responsive to the pulse group and the incoincidence signal produced in the regenerated clock period in which the pulse group is produced for controlling the frequency division ratio.

BRIEF DESCRIPTION OF THE DRAWING

FIG. 5 is a time chart of principal signals appearing in the circuits as shown in FIGS. 3 and 4;

DESCRIPTION OF THE PREFERRED EMBODIMENT

Figure 1:
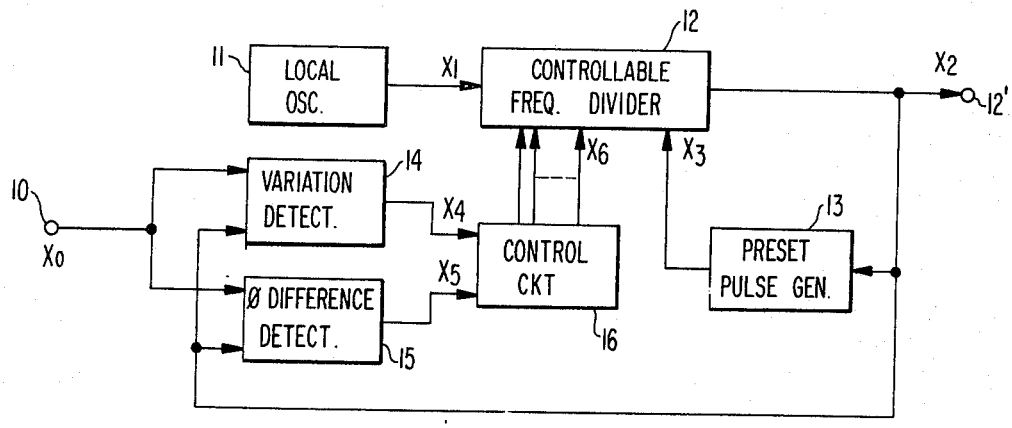
FIG. 1 is a block diagram of a conventional clock regenerator comprising a controllable frequency divider.

Referring to FIG. 1, description will be made at first of a conventional clock regenerator for a better understanding of the present invention. The clock regenerator comprises an input terminal 10 supplied with an input data signal $X_0$ of a clock frequency, a local oscillator 11 for generating a local signal $X_1$ of a local signal frequency approximately equal to an integral multiple of the clock frequency, and a down counter 12 responsive to the local signal $X_1$ for supplying a regenerated clock signal $X_2$ to an output terminal 12'. The local oscillator 11 is preferably a crystal oscillator, whereby it is possible to generate the local signal $X_1$ of a highly stable local signal frequency. The down counter 12 serves as a controllable frequency divider for dividing the local signal frequency at a frequency division ratio into the clock frequency. The input data signal $X_0$ varies between a first and a second state, such as a high and a low level, in compliance with the information being transmitted. Each of the high and low levels lasts for one or more bit periods or input clock periods. The input clock period and consequently the clock frequency is thus implicitly defined by the input data signal $X_0$. Furthermore, the regenerated clock signal $X_1$ may be a sequence of rectangular pulses defining a regenerated clock period by a pair of adjacent instants or points of build up or adjacent leading edges. The regenerated clock signal $X_2$ should be phase-synchronized with the input data signal $X_0$, namely, have the leading edges coincident with points of variation between the high and low levels in the input data signal $X_0$ unless the high or low level lasts more than one bit period.

Further referring to FIG. 1, a preset pulse generator 13 supplies preset pulses $X_3$ in response to the regenerated clock signal $X_2$ to preset the down counter 12 once in every regenerated clock period. A variation or incoincidence detector 14 produces an incoincidence signal $X_4$ when a variation between the high and low levels occurs, if any, in the input data signal $X_0$ during each of successive regenerated clock periods, namely, when the regenerated clock signal $X_2$ is out of phase with respect to the input data signal $X_0$. A phase difference detector 15 detects a phase difference between the input data signal $X_0$ and the regenerated clock signal $X_2$ to produce the phase difference sign signal $X_5$ representative of the sign of the phase difference. Responsive to the incoincidence signal $X_4$ and the sign signal $X_5$, a frequency divider control circuit 16 supplies a control signal $X_6$ to the down counter 12. More particularly, the control circuit 16 is a code converter for producing the control signal $X_6$ of a plurality of digits which represent a reference value when the input data signal $X_0$ and the regenerated clock signal $X_2$ are in phase, a greater value when the regenerated clock signal $X_2$ leads the input data signal $X_0$, and a smaller value when the regenerated clock signal $X_2$ lags behind the input data signal $X_0$. Responsive to the preset pulses $X_3$, the values given by the control signal $X_6$ are successively preset in the down counter 12. By way of example, let it be presumed that the regenerated clock signal $X_2$ is put out of phase for some reason or another to lead the input data signal $X_0$. The control signal $X_6$ is given the greater value to start pull-in, namely, to make the phase of the regenerated clock signal $X_2$ follow that of the input data signal $X_0$. The preset pulse $X_3$ presets the greater value in the down counter 12. It takes a longer time for the down counter 12 to completely count down in the next bit period. In other words, the frequency division ratio of the frequency divider 12 is rendered smaller. The regenerated clock signal $X_2$ therefore lags towards the correct phase to be theoretically eventually phase-synchronized with the input data signal $X_0$.

Figure 2:
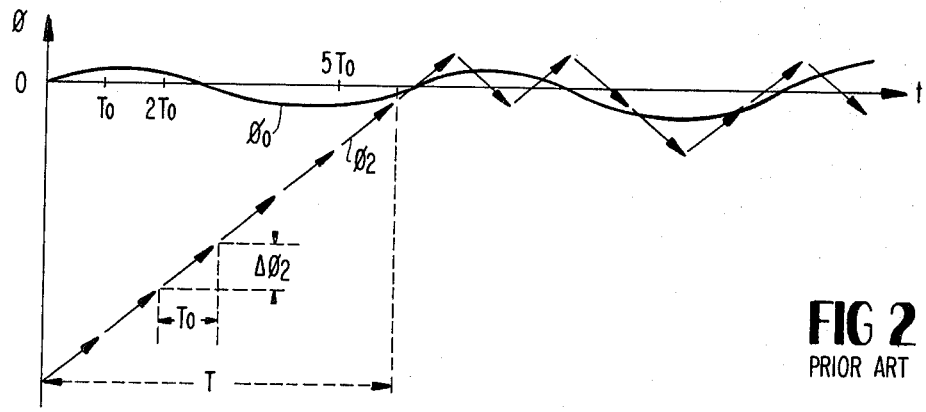
FIG. 2 shows a phase following characteristic of the conventional clock regenerator.

Referring to FIG. 1 again and to FIG. 2 afresh, let it be assumed that the input data signal $X_0$ varies alternatingly between the high and low levels at every bit period $T_0$ so that the incoincidence signals $X_4$ are successively procuded, one in each regenerated clock period, so long as the phase synchronism is out of order between the input data signal $X_0$ and the regenerated clock signal $X_2$. In FIG. 2, the abscissa and the ordinate represent time $t$ and phase $\phi$. An actual phase $\phi_0$ of the input data signal $X_0$ fluctuates crossing a zero line due to jitter. Let the regenerated clock signal $X_2$ have a phase $\phi_2$ (a symbol $\phi_1$ being not used) which is considerably different from the phase $\phi_0$ at $t = 0$, when the pull-in starts. The down counter 12 is controlled to give a phase variation $\Delta\phi_2$ to the regenerated clock signal $X_2$ in each bit period $T_0$ during a pull-in interval $\tau$ for establishing the phase synchronism. The pull-in interval $\tau$ decreases with an increase in the phase variation $\Delta\phi_2$. Amounts of jitter or fluctuation in the phase of the regenerated clock signal $X_2$, however, grow larger with a greater phase variation $\Delta\phi_2$. It should now be understood why the conventional clock regenerator has the defects pointed out in the preamble of the instant specification.

Figure 3:
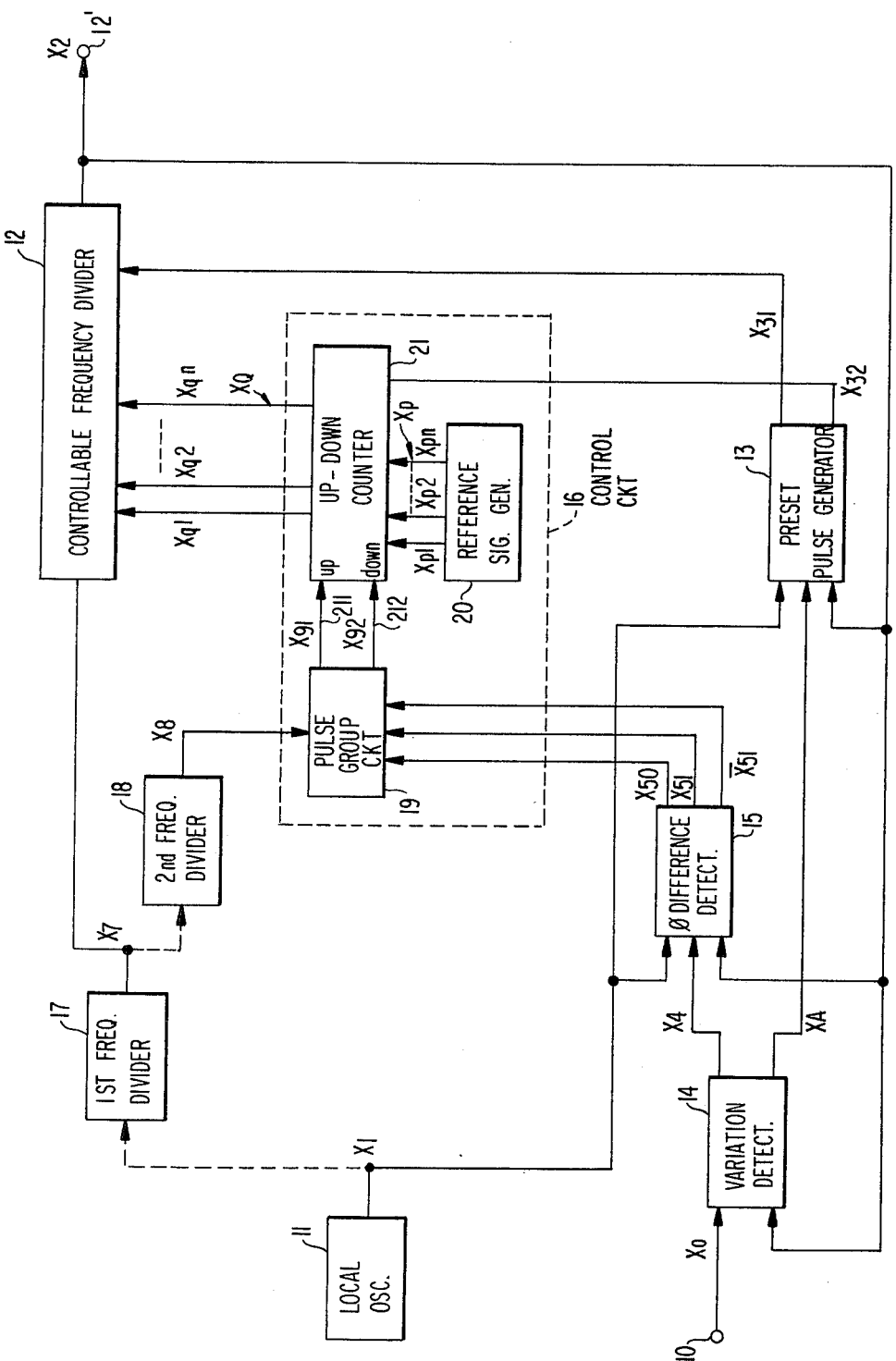
FIG. 3 is a block diagram of a clock regenerator according to a preferred embodiment of the present invention.
Figure 4:
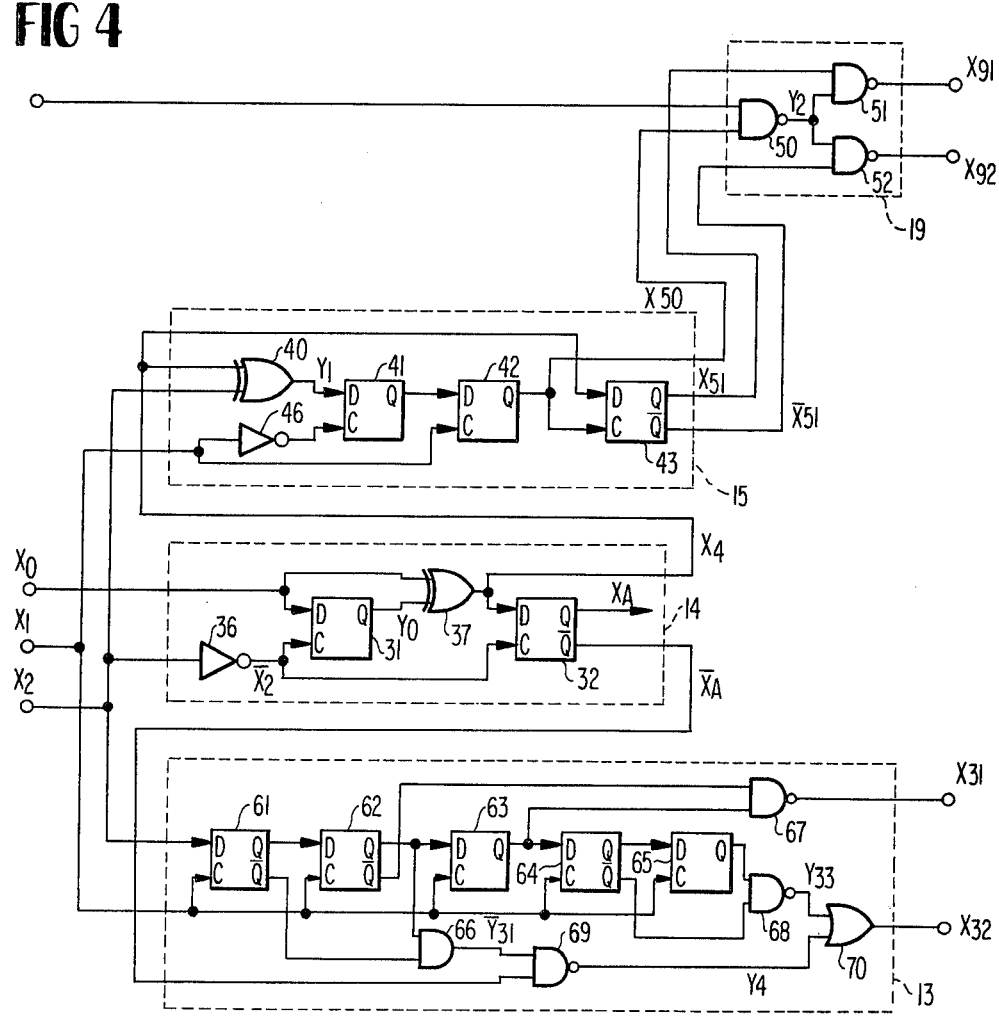
FIG. 4 is a detailed block diagram illustrating examples of certain parts of the clock regenerator depicted in FIG. 3.

Turning to FIGS. 3 and 5 with reference to FIG. 4 deferred for a short while, a clock regenerator according to a preferred embodiment of this invention comprises similar parts for dealing with and producing similar signals designated by like reference numerals and letters as in FIG. 1. In FIG. 5, it is presumed that the regenerated clock signal $X_2$ leads the input data signal $X_0$. Herein, the local signal $X_1$ is of a stable frequency sufficiently higher than the clock frequency, such as 3 MHz for a clock frequency of 300 Hz, although the local signal frequency may not be so high merely for deriving therefrom the regenerated clock signal $X_2$ by frequency division. A first fixed frequency divider 17 supplies a first frequency divided signal $X_7$ (not shown in FIG. 5) to the controllable frequency divider 12. A second fixed frequency divider 18 further frequency divides the first frequency divided signal $X_7$ into a second frequency divided signal $X_8$. Instead of the signal preset pulses, the preset pulse generator 13 produces first preset or frequency divider read-in pulses $X_{31}$ (illustrated in FIG. 5 near the bottom) a short interval after the trailing edges of the regenerated clock signal $X_2$ and consequently the short interval after instants bisecting every regenerated clock period. In the illustrated example, the incoincidence signal $X_4$ is similar to the regenerated clock signal $X_2$ except that the former signal $X_4$ has leading edges shifted to the nearest points of variation between the high and low levels in the input data signal $X_0$ (the leading edge of the former signal $X_4$ leading the corresponding leading edges of the regenerated clock signal $X_2$ if the latter signal $X_2$ lags behind the input data signal $X_0$). The phase detector 15 therefore makes use of the incoincidence signal $X_4$ instead of the input data signal $X_0$ per se and produces a phase difference magnitude signal $X_{50}$ having in each regenerated clock period a pulse whose width is representative of an amount or magnitude of the phase difference so long as the phase synchronism does not exist between the input data signal $X_0$ and the regenerated clock signal $X_2$. The phase detector 15 further produces a phase difference sign signal $X_{51}$ which takes a low level when the regenerated clock signal $X_2$ leads the input data signal $X_0$ and may still further produce another phase difference sign signal $\overline{X}_{51}$, the bar above a reference letter designating a signal being representative of inversion of the signal. It should be pointed out in these respects that it still is possible to say that the phase difference detector 15 produces the phase difference magnitude and sign signals $X_5$ (the second suffixes being omitted) in response to the input data signal $X_0$ and the regenerated clock signal $X_2$. In order to insure timing of the first preset pulses $X_{31}$ and of the phase difference signals $X_5$, use is made of the local signal $X_1$ of the sufficiently high local signal frequency in the example being illustrated in the preset pulse generator 13 and the phase difference detector 15. The control signal is herein designated generally by $X_Q$ and consists of a plurality of binary signals $X_{q1}, X_{q2}, \ldots,$ and $X_{qn}$ representative of an n-digit binary number Q. The first preset pulses $X_{31}$ read the binary number Q into the frequency divider 12. Inasmuch as use is made in the illustrated phase difference detector 15 of the incoincidence signal $X_4$, it is possible to say that the frequency divider control circuit 16 produces the control signal $X_Q$ in response to the incoincidence and phase difference signals $X_4$ and $X_5$.

Further referring to FIGS. 3 and 5, the frequency divider control circuit 16 comprises a pulse group circuit 19 responsive to the second frequency divided signal $X_8$ and the phase difference signals $X_5$ for producing a first and a second pulse sequence $X_{91}$ or $X_{92}$ when the regenerated clock signal $X_2$ leads or lags behind the input data signal $X_0$, respectively. The pulse sequency $X_9$ (the second suffix 1 or 2 being omitted) has in each regenerated clock period a pulse or group of pulses of the second frequency divided signal $X_8$ of a number corresponding to the phase difference amount indicated by the phase difference magnitude signal $X_{50}$. The frequency divider control circuit 16 further comprises a reference signal generator 20 for producing in the known manner a reference signal $X_P$ consisting of a plurality of binary signals $X_{p1}, X_{p2}, \ldots,$ and $X_{pn}$ capable of being manually or otherwise adjusted to indicate a reference value P similar to the reference value which the control signal $X_6$ described in conjunction with the conventional clock regenerator represents when there is phase synchronism. The frequency divider control circuit 16 still further comprises an up-down counter 21 for carrying out up-counting and down-counting in response to the pulses of the sequences $X_{91}$ and $X_{92}$ supplied to an up and a down count terminal 211 and 212, respectively. The variation detector 14 further produces a variation timing signal $X_A$ (depicted in FIG. 5 below the incoincidence signal $X_4$) having leading and trailing edges coincident with the trailing edges of the regenerated clock signal $X_2$ in regenerated clock periods in which a point and no point of variation between the high and low levels appear, respectively, in the input data signal $X_0$. Responsive to the regenerated clock signal $X_2$ and the variation timing signal $X_A$, the preset pulse generator 13 produces second preset or up-down counter read-in pulses $X_{32}$ a short interval after every first preset pulse $X_{31}$ and, in addition, a very short interval after the regenerated clock signal $X_2$ trailing edge while the variation timing signal $X_A$ takes the low level to indicate correct phase synchronism. The high-frequency local signal $X_1$ is used in the preset pulse generator 13 to again time the second preset pulses $X_{32}$. The second preset pulses $X_{32}$ read the reference value P into the up-down counter 21. Operation of the up-down counter 21 will be described later.

Referring now to FIGS. 4 and 5, the variation or incoincidence detector 14 comprises first and second flip-flop circuits 31 and 32 of the D type, each having C, D, Q and $\overline{Q}$ terminals, the $\overline{Q}$ terminal being not depicted where unnecessary. Responsive to the regenerated clock signal $X_2$, an inverter 36 supplies an inverted regenerated clock signal $\overline{X}_2$ to the C terminal of the flip-flop circuits 31 and 32. The input data signal $X_0$ is supplied to the D terminal of the first flip-flop circuit 31, which produces a delayed input data signal $Y_0$ delayed by a half bit period. Responsive to the input data and the delayed input data signals $X_0$ and $Y_0$, an Exclusive OR gate 37 produces the incoincidence signal $X_4$. Through sampling extraction of the incoincidence signal $X_4$ at the leading edge of the inverted regenerated clock signal $\overline{X}_2$, the second flip-flop circuit 32 produces the variation timing and the inverted variation timing signals $X_A$ and $\overline{X}_A$. The phase difference detector 15 comprises an Exclusive OR gate 40 responsive to the regenerated clock signal $X_2$ and the incoincidence signal $X_4$ for producing an Exclusive OR pulse sequence $Y_1$ which is similar to the phase difference magnitude signal $X_{50}$. The phase difference detector 15 further comprises first, second and third flip-flop circuits 41, 42 and 43 of the D type. The local signal $X_1$ is supplied to the C terminals of the first and second flip-flop circuits 41 and 42 through an inverter 46 and directly, respectively, so as to successively delay the Exclusive OR pulse sequence $Y_1$ into the phase difference magnitude signal $X_{50}$. Through sampling extraction of the incoincidence signal $X_4$ at the leading edge of the phase difference magnitude signal $X_{50}$, the third flip-flop circuit 43 produces the phase difference sign signals $X_{51}$ and $\overline{X}_{51}$. The pulse group circuit 19 comprises a NAND gate 50 responsive to the phase difference magnitude signal $X_{50}$ and the second frequency divided signal $X_8$ for producing a NAND output pulse sequence $Y_2$ having pulse groups mentioned in conjunction with the first and second pulse sequences $X_{91}$ and $X_{92}$, which are produced through NAND gates 51 and 52. The illustrated example of the phase difference detector 15 and the pulse group circuit 19 produce superfluous pulses and pulse groups depicted in FIG. 5 near the right margin. These, however, have no direct connection with the operation of the up-down counter 21.

Figure 6:
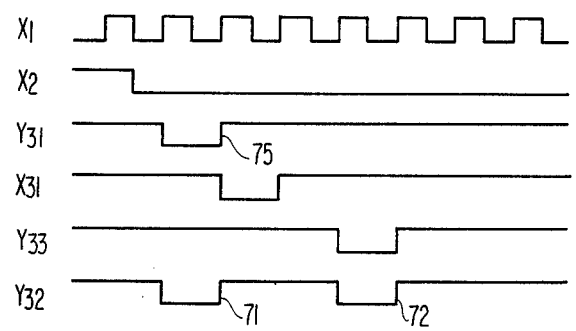
FIG. 6 is a detailed time chart of several of the signals depicted in FIG. 5.

Referring to FIGS. 4 and 5 again and to FIG. 6 afresh, the preset pulse generator 13 comprises first through fifth flip-flop circuits 61, 62, 63, 64 and 65 of the D type which are supplied with local signal $X_1$ at the C terminal to successively shift the regenerated clock signal $X_2$ supplied to the D terminal of the first flip-flop circuit 61. Responsive to the $\overline{Q}$ output signal of the first flip-flop circuit 61 and the Q output signal of the second flip-flop circuit 62, an AND gate 66 produces first differentiated pulses $\overline{Y}_{31}$ (illustrated in FIGS. 5 and 6 as uninverted pulses $Y_{31}$). Responsive to the $\overline{Q}$ output signal of the second flip-flop circuit 62 and the Q output signal of the third flip-flop circuit 63, a NAND gate 67 produces second differentiated pulses as the first preset pulses $X_{31}$. Responsive to the $\overline{Q}$ output signal of the fourth flip-flop circuit 64 and the Q output signal of the fifth flip-flop circuit 65 another NAND gate 68 produces third differentiated pulses $Y_{33}$ (a symbol $Y_{32}$ being not used). Responsive to the inverted variation timing signal $\overline{X}_A$ and the first differentiated pulses $\overline{Y}_{31}$, still another NAND gate 69 produces as short pulses $Y_4$ those inverted first differentiated pulses $\overline{Y}_{31}$ which appear when the variation timing signal $X_A$ takes the low level. Responsive to the third differentiated pulses $Y_{33}$ and the short pulses $Y_4$, an OR gate 70 produces the second preset pulses $X_{32}$. It is now understood as has already been described that each first preset pulse $X_{31}$ is immediately followed by a second preset pulse $X_{32}$ and that a first preset pulse $X_{31}$ is preceded by a preceding one of a pair of second preset pulses 71 and 72 so long as no point of variation appears within a regenerated clock period. In other words, the preset pulse generator 13 produces in response in effect to the regenerated clock signal $X_2$ and the incoincidence signal $X_4$ the up-down counter read-in pulses $X_{32}$ of a first sequence, such as 71, at predetermined instants 75 of the respective regenerated clock periods in the absence of the incoincidence signal $X_4$ and additionally, only when the regenerated clock signal $X_2$ lags behind the input data signal $X_0$, at the predetermined instant 75 of that particular one of the successive regenerated clock periods during which the incoincidence signal $X_4$ is produced for the first time in a continuous series of at least one incoincidence signal $X_4$. The preset pulse generator 13 further produces the up-down counter read-in pulses $X_{32}$ of a second sequence, such as 72, a first predetermined interval after every predetermined instant 75 irrespective of presence and absence of the incoincidence signal $X_4$. Responsive to the regenerated clock signal $X_2$, the preset pulse generator 13 still further produces the frequency divider read-in pulses $X_{31}$ a second predetermined interval after every predetermined instant 75. The second predetermined interval is shorter than the first predetermined interval.

Referring once again to FIGS. 3, 5 and 6, let it be presumed at first that the input data signal $X_0$ and the regenerated clock signal $X_2$ are not in phase synchronism. If the regenerated clock signal $X_2$ leads the input data signal $X_0$ as exemplified in FIG. 5, the reference value P read into the up-down counter 21 either by a single or isolated second preset pulse $X_{32}$ or by a succeeding one, such as 72, of a second preset pulse pair is upcounted in compliance with the pulse or pulses of a next following group of the first pulse sequence $X_{91}$ to a certain binary number Q that is greater than the reference value P. The next following first preset pulse $X_{31}$ that appears approximately one regenerated clock period later than the above-mentioned isolated second preset pulse or succeeding one of the second preset pulse pair $X_{32}$ reads the greater binary number Q as the control signal $X_Q$ into the frequency divider 12 to render in effect the frequency division ratio smaller and to thereby make the regenerated clock signal $X_2$ lag towards the correct phase. When the phase synchronism is achieved, the second preset pulses $X_{32}$ are produced in pairs. The preceding one, such as 71, reads the reference value P into the up-down counter 21. The immediately following first preset pulse $X_{31}$ transfers the reference value P to the frequency divider 12 as the control signal $X_Q$. The next succeeding second preset pulse, such as 72, again loads the up-down counter 21 with the reference value P, which has no effect unless an incoincidence signal $X_4$ appears in that particular regenerated clock period and the regenerated clock period next following the particular regenerated clock period in which the said next succeeding second preset pulse, such as 72, is produced according as the regenerated clock signal $X_2$ leads or lags behind the input data signal $X_0$, respectively.

Figure 7:
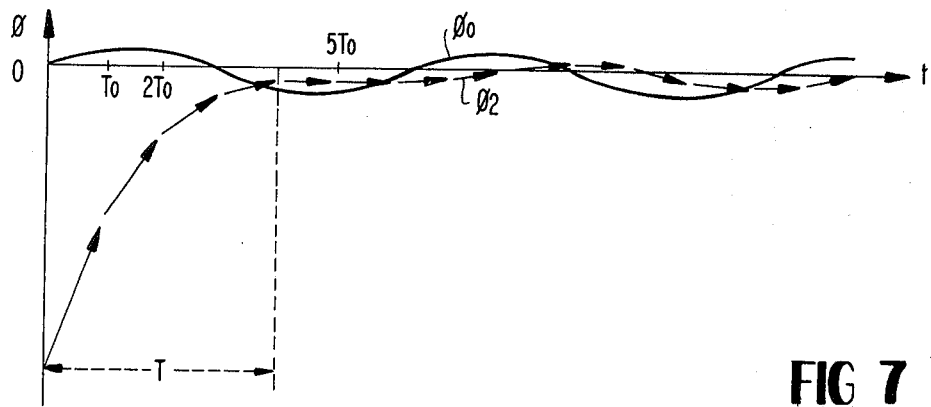
FIG. 7 shows a phase following characteristic of the clock regenerator illustrated in FIG. 3.

Referring finally to FIG. 7 which is similar to FIG. 2, the phase $\phi_2$ of the regenerated clock signal $X_2$ follows or is pulled into, the phase $\phi_0$ of the input data signal $X_0$ with a considerably greater phase difference at the beginning of the pull-in. As the phase difference between the signals $X_0$ and $X_2$ is reduced, the phase variation is rendered smaller in proportion to the number of pulse or pulses of a group indicative of the phase difference in the first or second pulse sequence $X_9$. This astonishingly reduces the jitter in the phase $\phi_2$ of the regenerated clock signal $X_2$ while reducing the pull-in time $\tau$.

While this invention has thus far been described in conjunction with a preferred embodiment thereof, it is now clearly understood that other embodiments and modifications are possible. For instance, it is possible as indicated by a dashed line connecting the illustrated local oscillator 11 and the first fixed frequency divider 17 to use as the first fixed frequency divider 17 another local oscillator for another local signal of a not so high frequency. It is also possible as indicated by another dashed line drawn between the first and second fixed frequency dividers 17 and 18 to use as the second fixed frequency divider 18 a second local oscillator for a second local signal of a sufficiently high frequency and to make the frequency divider control circuit 16 produce the control signal $X_Q$ in response to the second local signal rather than to the second frequency divided signal $X_8$. The frequency dividers 17 and 18 may be frequency multipliers. It is possible to use as the controllable frequency divider 12 an up counter which is reset by the frequency divider read-in pulses $X_{31}$ when the count reaches the binary number Q indicated by the control signal $X_Q$. The circuit elements exemplified in FIG. 4 in one of the blocks 13, 14, 15 and 19 may be organized differently than as shown. For example, it is possible to place the second flip-flop circuit 32 in the preset pulse generator 13 rather than as depicted, in the incoincidence detector 14.

What is claimed is:

1. In a clock regenerator responsive to an input data signal taking one of a first and a second state during at least one bit period for producing a regenerated clock signal of a regenerated clock period phase-synchronized with said bit period, comprising a local oscillator for generating a local signal of a frequency substantially equal to an integral multiple of the bit frequency of said input data signal, a controllable frequency divider for frequency dividing said local signal at a frequency division ratio into said regenerated clock signal, first means responsive to said input data and regenerated clock signals for producing an incoincidence signal when a point of variation between said first and second states appears during one of the successive regenerated clock periods in said input data signal, second means responsive to said input data and regenerated clock signals for producing a phase difference signal representative of a phase difference between each of the successive bit periods and a corresponding one of the successive regenerated clock periods, and third means responsive to said incoincidence and phase difference signals for controlling said frequency division ratio, the improvement wherein said third means comprises pulse group means responsive to said phase difference signal for producing a pulse group of at least one pulse of a number indicative of said phase difference, and control means responsive to said pulse group and the incoincidence signal produced within the regenerated clock period for which said pulse group is produced for controlling said frequency division ratio.

2. A clock regenerator as claimed in claim 1, said local signal being a series of local signal pulses, wherein said pulse group means comprises means responsive to said local signal pulses and said phase difference signal for deciding said number of at least one pulse.

3. A clock regenerator as claimed in claim 1, wherein said pulse group means comprises pulse generating means for generating local pulses of a repetition frequency higher than said bit frequency and means responsive to said local pulses and said phase difference signal for deciding said number of at least one pulse.

4. A clock regenerator as claimed in claim 1, wherein said second means comprises sign means responsive to said input data and regenerated clock signal for producing a first or a second sign signal when said regenerated clock signal leads or lags behind said input data signal, respectively, and magnitude means responsive to said input data and regenerated clock signals for producing a magnitude signal representative of an absolute value of said phase difference, wherein said pulse group means comprises means for producing one at a time a first or a second pulse train in response to said magnitude signal and to said first or second sign signals, respectively, said one of said first or second pulse trains having said pulse group, said number of at least one pulse being decided by said magnitude signal, and wherein said control means comprises counter means responsive to said pulse group of said one pulse train and the incoincidence signal produced during the regenerated clock period for which said pulse group is produced for controlling said frequency division ratio.

5. A clock regenerator as claimed in claim 4, wherein said counter means comprises a reference signal generator for generating a reference signal indicative of a reference value, first preset means responsive to said regenerated clock and incoincidence signals for producing first preset pulses of a first or a second sequence at predetermined instants of the respective regenerated clock periods in the absence of said incoincidence signal and a first predetermined interval after every one of said predetermined instants irrespective of presence or absence of said incoincidence signal, respectively, second preset means responsive to said regenerated clock signal for producing second present pulses a second predetermined interval after every one of said predetermined instants, an up-down counter, means responsive to said first preset pulses of said first or second sequences for presetting said reference value in said up-down counter, means responsive to said pulse group of said first or second pulse trains for making said up-down counter count up or count down, respectively, said reference value to provide a digital value, and means responsive to each of said second preset pulses for controlling said frequency division ratio in compliance with the value held in said up-down counter, said first preset means further producing a first preset pulse of said first sequence, only when said regenerated clock signal lags behind said input data signal, at the predetermined instant of that one of the successive regenerated clock period during which the incoincidence signal is produced for the first time in a continuous series of at least one incoincidence signal, said second predetermined interval being shorter than said first predetermined interval.

* * * * *